(12) United States Patent
Smith

(10) Patent No.: US 6,220,013 B1
(45) Date of Patent: Apr. 24, 2001

(54) MULTI-PRESSURE REHEAT COMBINED CYCLE WITH MULTIPLE REHEATERS

(75) Inventor: Raub Warfield Smith, Ballston Lake, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/394,427

(22) Filed: Sep. 13, 1999

(51) Int. Cl.$^7$ ..................................... F02C 6/00
(52) U.S. Cl. ................. 60/39.02; 60/39.182; 110/7 B
(58) Field of Search .............. 60/39.02, 39.182; 110/7 R, 7 B

(56) References Cited

U.S. PATENT DOCUMENTS

| | | | |
|---|---|---|---|
| 4,858,562 | * 8/1989 | Arakawa et al. | 122/7 R |
| 4,944,252 | * 7/1990 | Motai et al. | 122/470 |
| 5,379,588 | 1/1995 | Tomlinson | 60/39.182 |
| 5,442,908 | * 8/1995 | Briesch et al. | 60/39.182 |
| 5,577,377 | 11/1996 | Tomlinson | 60/39.182 |
| 5,628,179 | 5/1997 | Tomlinson | 60/39.182 |
| 6,062,017 | * 5/2000 | Liebig | 60/39.182 |

FOREIGN PATENT DOCUMENTS

| | | |
|---|---|---|
| 2-259301 | 10/1990 | (JP) . |
| 3-282102 | 12/1991 | (JP) . |
| 10-131716 | 5/1998 | (JP) . |
| 10-131717 | 5/1998 | (JP) . |
| 10-131718 | 5/1998 | (JP) . |
| 10-131719 | 5/1998 | (JP) . |

\* cited by examiner

*Primary Examiner*—Ted Kim
(74) *Attorney, Agent, or Firm*—Nixon & Vanderh

(57) ABSTRACT

A multi-pressure reheat combined cycle configuration in which the HP steam turbine exhaust temperature is colder than the HP steam saturation temperature and the coldest section of the reheater is placed downstream of the high pressure evaporation section in the heat recovery steam generator gas path with respect to the direction of exhaust gas flow. When configured in this manner, the optimum reheat pressure for the cycle is lower then for a cycle with all reheating taking place upstream of the HP evaporation section in the HRSG gas path, and the cycle output and efficiency are improved.

19 Claims, 4 Drawing Sheets

MULTI-PRESSURE REHEAT COMBINED CYCLE WITH MULTIPLE REHEATERS

BACKGROUND OF THE INVENTION

The present invention relates to a multi-pressure reheat combined cycle configuration and, in particular, such a combined cycle configuration in which cycle output and efficiency are improved.

The optimization of steam cycle conditions for a combined cycle (CC) steam plant is a strong function of the constraints placed on the evaluation. A key constraint is the configuration of the surfaces within the heat recovery steam generator (HRSG), which relate not only to the gross cycle configuration, that is one pressure vs. two pressure vs. three pressure cycle, or reheat vs. non-reheat, etc., but also finer scale details of achievable steam conditions and cost/performance trade-off studies.

Traditionally, studies of optimal reheat pressure for a three pressure reheat bottoming cycle have been performed with the reheat sections of the HRSG constrained to be upstream of the HP evaporator section with respect to the exhaust gas flow. An exemplary such HRSG is shown and described, for example, in U.S. Pat. No. 5,628,179, the disclosure of which is incorporated herein by this reference. These studies showed that cycle output peaked at approximately 20–25% $P_{CRH}/P_{THROTTLE}$. This result was obtained for a three pressure reheat cycle wherein the IP superheater discharge steam is combined with the cold reheat (CRH) steam from the steam turbine and sent to the reheater. A similar result was obtained as well with two and three pressure cycle variations wherein the IP steam was generated at a pressure less than $P_{CRH}$ and admitted to an IP turbine admission.

BRIEF SUMMARY OF THE INVENTION

A more recent study demonstrated that combined cycle performance could be improved by reducing reheat pressure and placing some of the reheater surface downstream of the HP evaporator section in the heat recovery steam generator. This result overturned all previous studies of optimal reheat pressure which had been erroneously constrained to perform of all the steam reheating in an HRSG reheater section upstream of the HP evaporator, which adversely impacts HP steam production when the cold reheat pressure is less than approximately 20% of throttle pressure.

The invention is thus embodied in an improved HRSG surface arrangement which in combination with appropriate cycle steam conditions yields a cost effective performance improvement over current steam bottoming cycle practice. A key feature of the proposed arrangement is placement of the coldest section of the reheater downstream of the HP evaporation section with respect to the direction of exhaust gas flow. This improves steam bottoming cycle performance because it allows use of lower reheat pressures without a penalty in HP steam production. Lower reheat pressure as compared to current practice improves cycle output by reducing steam turbine exhaust moisture which improves steam turbine efficiency.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
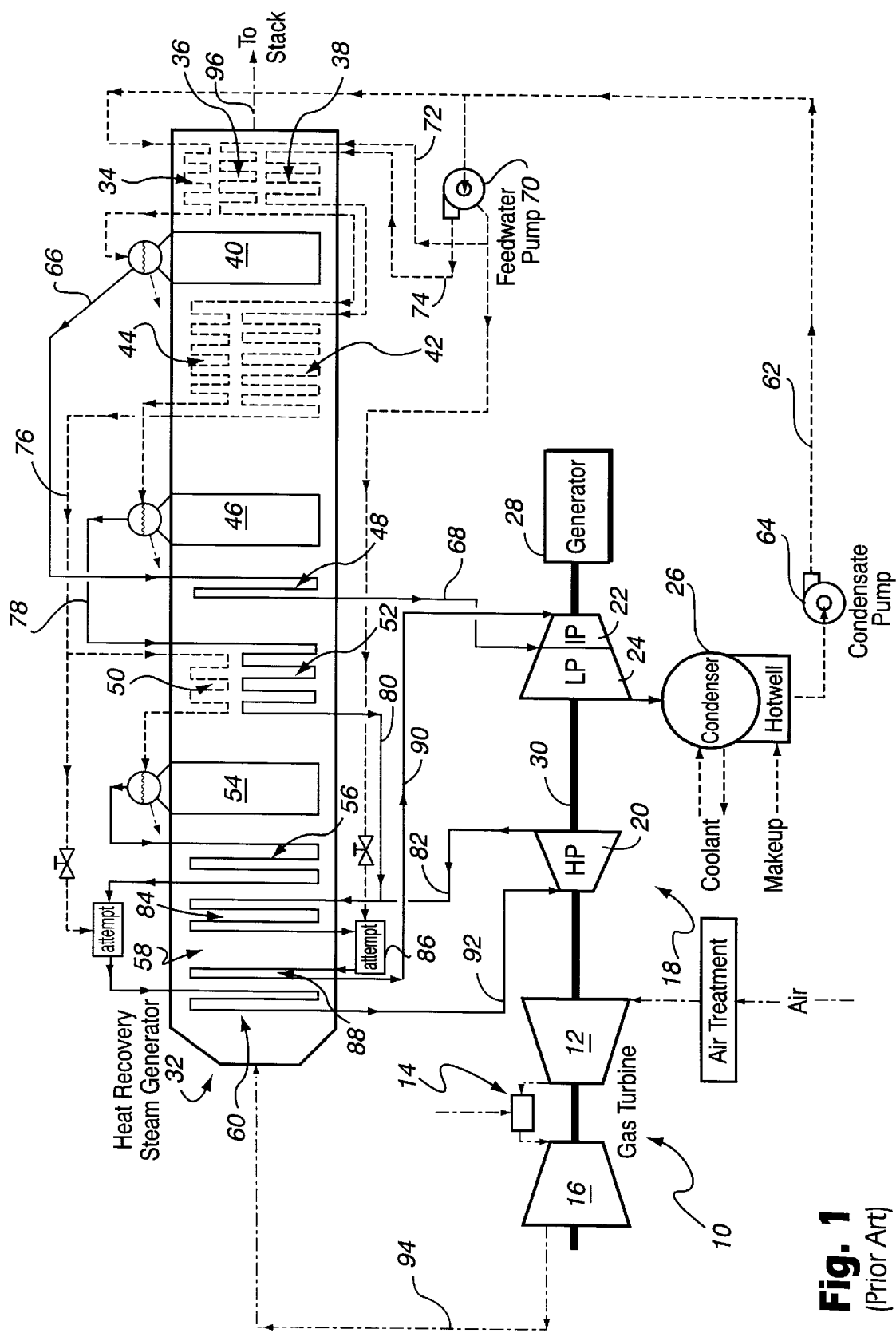
FIG. 1 is a schematic illustration of a conventional combined cycle system.

The invention is incorporated in a single pressure or a multi-pressure reheat combined cycle power generation system. A schematic of a conventional three pressure reheat combined cycle power generation system is shown in FIG. 1. In this schematic illustration steam flow is indicated by a solid line, water flow is indicated by a dashed line, and air and gas flow are indicated by a long and short dash line.

This example includes a gas turbine system 10 comprising a compressor 12, a combustion system 14 and a gas turbine 16, and a steam turbine system 18 including a high pressure section 20, an intermediate pressure section 22, and one or more low pressure sections 24 with multiple steam admission points at different pressures. The low pressure section 24 exhausts into a condenser 26. The gas turbine 10 and steam turbine 18 drive the generator 28 (or other load). The gas turbine 10, steam turbine system 18, and generator 28 may be arranged in tandem, on a single shaft 30 as shown in FIG. 1, or in a multi-shaft configuration wherein the gas turbine and steam turbine drive separate loads.

The steam turbine system 18 is associated with a multi-pressure HRSG 32 which includes low pressure (LP), intermediate pressure (IP) and high pressure (HP) economizers 34, 36, 38, respectively, an LP evaporator 40, further HP and IP economizers 42, 44, an IP evaporator 46, an LP superheater 48, a final HP economizer 50, an IP superheater 52, an HP evaporator 54, an HP superheater section 56, a reheater 58, and a final HP superheater section 60.

Condensate is fed from condenser 26 to the HRSG 32 via conduit 62 with the aid of condensate pump 64. The condensate subsequently passes through the low pressure (LP) economizer 34 and into the LP evaporator 40. Steam from the LP evaporator 40 is fed via conduit 66 to the LP superheater 48 and then returned to the low pressure section 24 of the steam turbine 18 via conduit 68 and appropriate LP admissions stop/control valve(s) (not shown).

Feedwater with the aid of feedwater pump(s) 70 passes (1) through the IP economizers 36, 44 via conduit 72 and to the IP evaporator 46, and (2) through the HP economizers 38, 42 via conduit 74 and then on to the final HP economizer 50 via conduit 76. At the same time, steam from the IP evaporator 46 passes via conduit 78 to the IP superheater 52 and thereafter flows via conduit 80, is combined with the cold reheat steam 82 from the HP section 20 of the steam turbine 18 and sent through one pass 84 of the reheater 58 and through an attemperator 86. After flowing through a second pass 88 of the reheater 58, the reheated steam is returned to the IP section 22 of the steam turbine 18 via conduit 90 (and appropriate stop/control valves not shown).

Meanwhile, condensate in the final HP economizer 50 is passed to the HP evaporator 54. Steam exiting the HP evaporator 54 passes through the HP superheater sections 56 and 60 and is returned to the HP section 20 of the steam turbine 18 by way of conduit 92 and appropriate stop/control valves (if required, not shown).

Heat is provided to the HRSG 32 by the exhaust gases from gas turbine 16 introduced into the HRSG via conduit 94 and which exit the HRSG to a stack (not shown) via conduit 96.

As mentioned above, FIG. 1 illustrates the conventional arrangement with regard to the placement of the coldest reheater section 84 within the HRSG 32. Exhaust from the gas turbine 16 enters the HRSG 32 where it encounters high temperature superheater 60 and 56 and reheater 58 sections 88, 84 disposed upstream of the HP evaporator 54 with respect to the direction of gas flow. Thus, in this conventional arrangement, the coldest section 84 of reheater 58 is upstream of HP evaporator 54 and, as mentioned above, the IP superheater 52 discharge is combined with the cold reheat steam 82 from the HP section 20 of the steam turbine 18 and sent through the reheater 58.

The multi-pressure reheat configuration provided in accordance with the invention is a modification of a conventional combined cycle system of the type illustrated in FIG. 1 and described above with respect thereto. Those components of the inventive system that correspond to components of the conventional system are identified with corresponding reference numbers incremented by a factor of 100. However, a detailed discussion of the components of the embodiments of the inventive system will be generally limited to those that differ from the conventional configuration. Reference numbers shown in FIGS. 2 and 3 but not discussed hereinbelow are substantially identical to the corresponding components of the conventional system and are labeled to provide a frame of reference.

As noted above with respect to FIG. 1, in the conventional arrangement, the coldest section 84 of the reheater 58 is disposed upstream of the HP evaporator 54. In the configuration proposed in accordance with the present invention, schematically illustrated in FIG. 2, the coldest section 184 of the reheater 158 is downstream of the HP evaporator 154. In the presently preferred embodiment, the exhaust 182 from the HP section 120 of steam turbine 118 will be mixed with IP steam of equal temperature that may be supplied either directly from the IP steam drum 198, if present, or an IP superheater 152 itself downstream of the HP evaporator 154 and upstream of the IP evaporator 146. The presence or absence of the IP superheater 152 will be governed by the economic and performance trade-offs of achieving a temperature match with the HP steam turbine exhaust 182.

Figure 3:
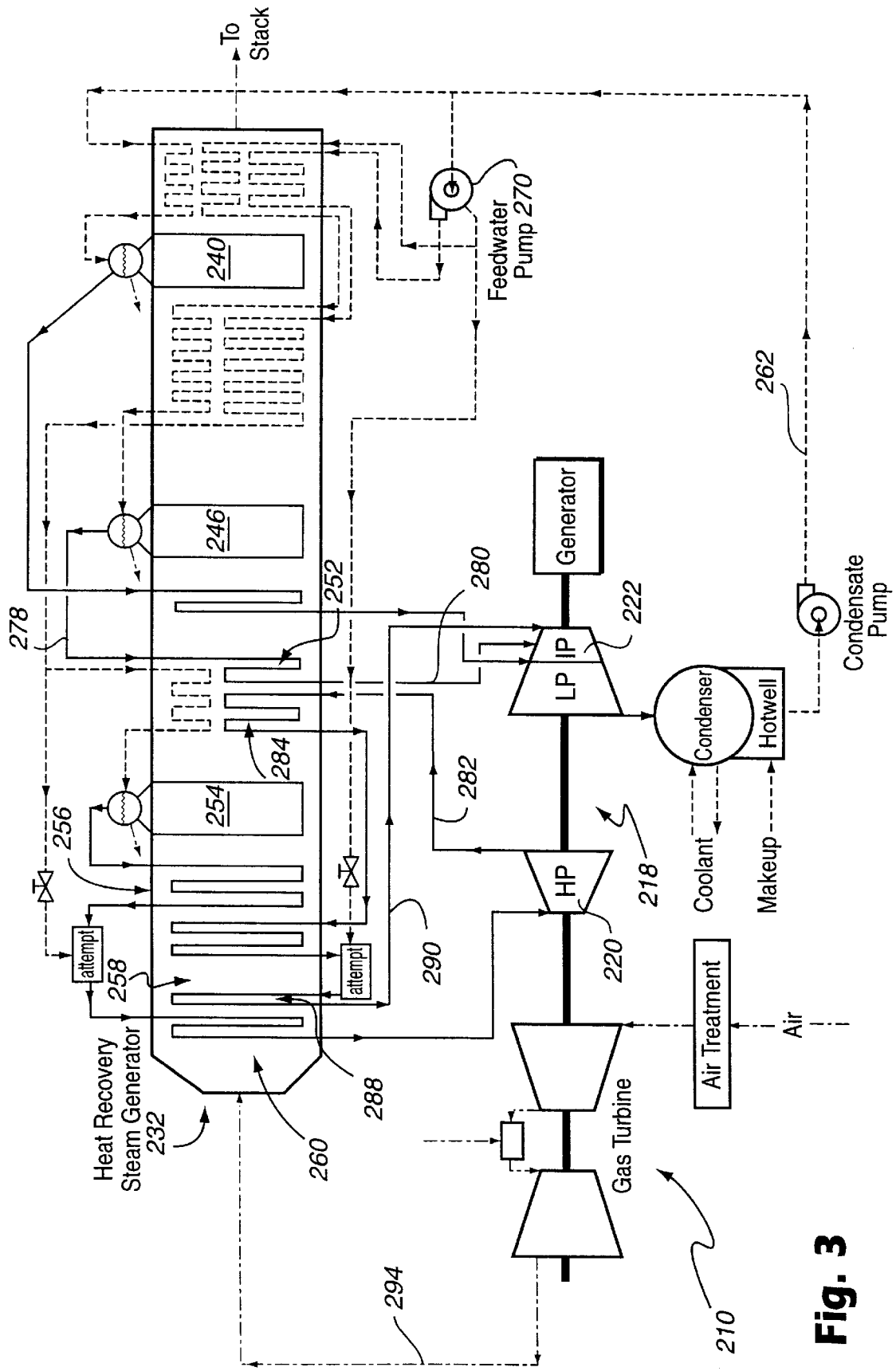
FIG. 3 is a schematic illustration of a combined cycle system in accordance with an alternate embodiment of the invention.

FIG. 3 shows a further alternate embodiment of the invention in which the IP steam 280 is not mixed with the HP steam turbine exhaust 282. Rather, in this embodiment, the IP stream 280 is admitted to the IP section of the steam turbine 218 at a pressure lower than the hot reheat pressure and at a temperature determined through evaluation of the economic and performance trade-offs associated with superheating this steam.

Figure 2:
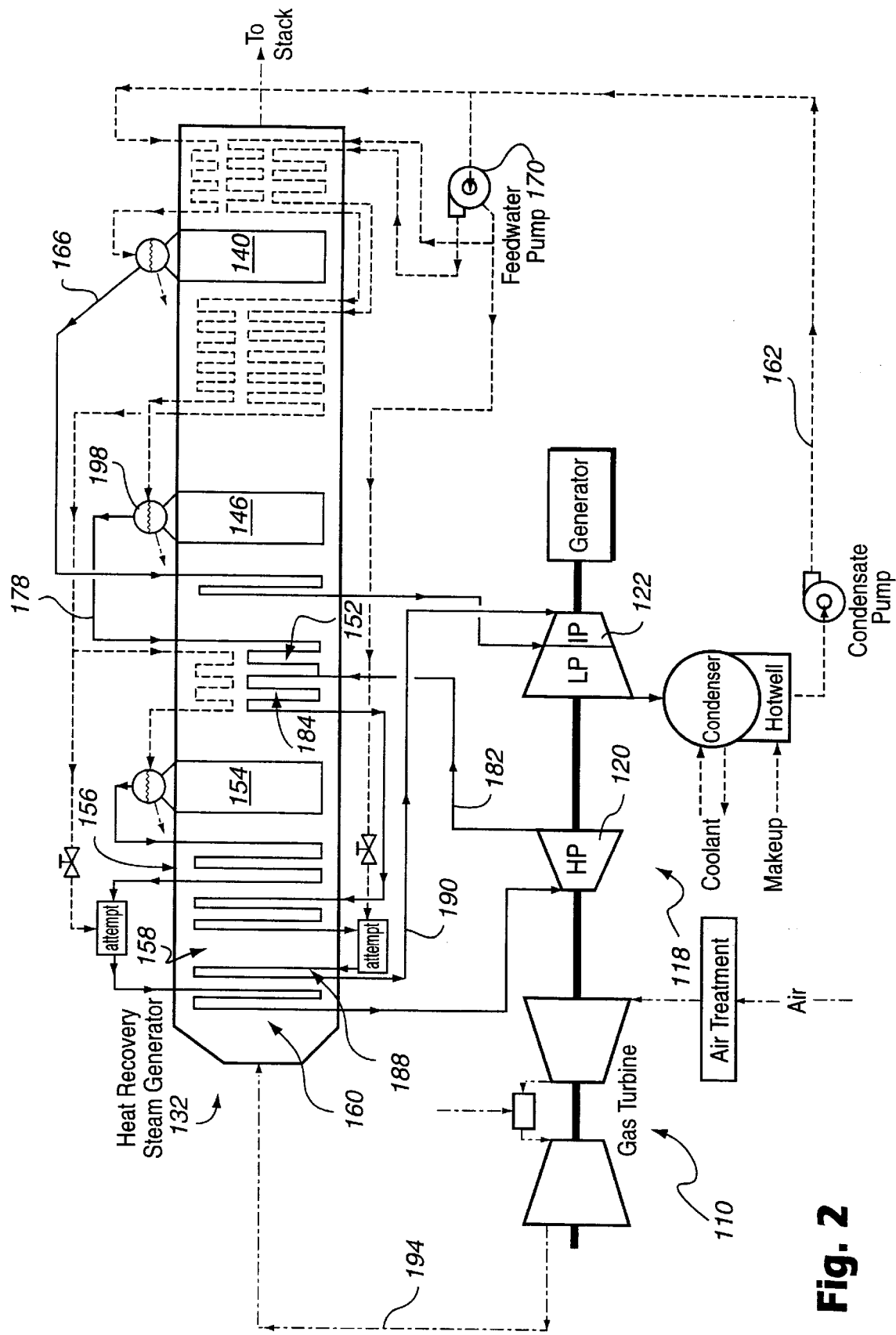
FIG. 2 is a schematic illustration of a combined cycle system in accordance with an exemplary embodiment of the invention.

FIGS. 2 and 3 show embodiments of the invention adapted to a three pressure system, but as will be appreciated from a review of the foregoing discussion, the same principle of placing the coldest reheater downstream of the high pressure evaporation section can be applied to a cycle with any number of pressure levels (1 or more). The figures also show a drum type HRSG which is also not necessary to the implementation of the invention and realization of its benefits. The HRSG could be of once through design with no steam drums or even supercritical in which case the reheating of steam downstream of the HP pinch would be covered.

Figure 4:
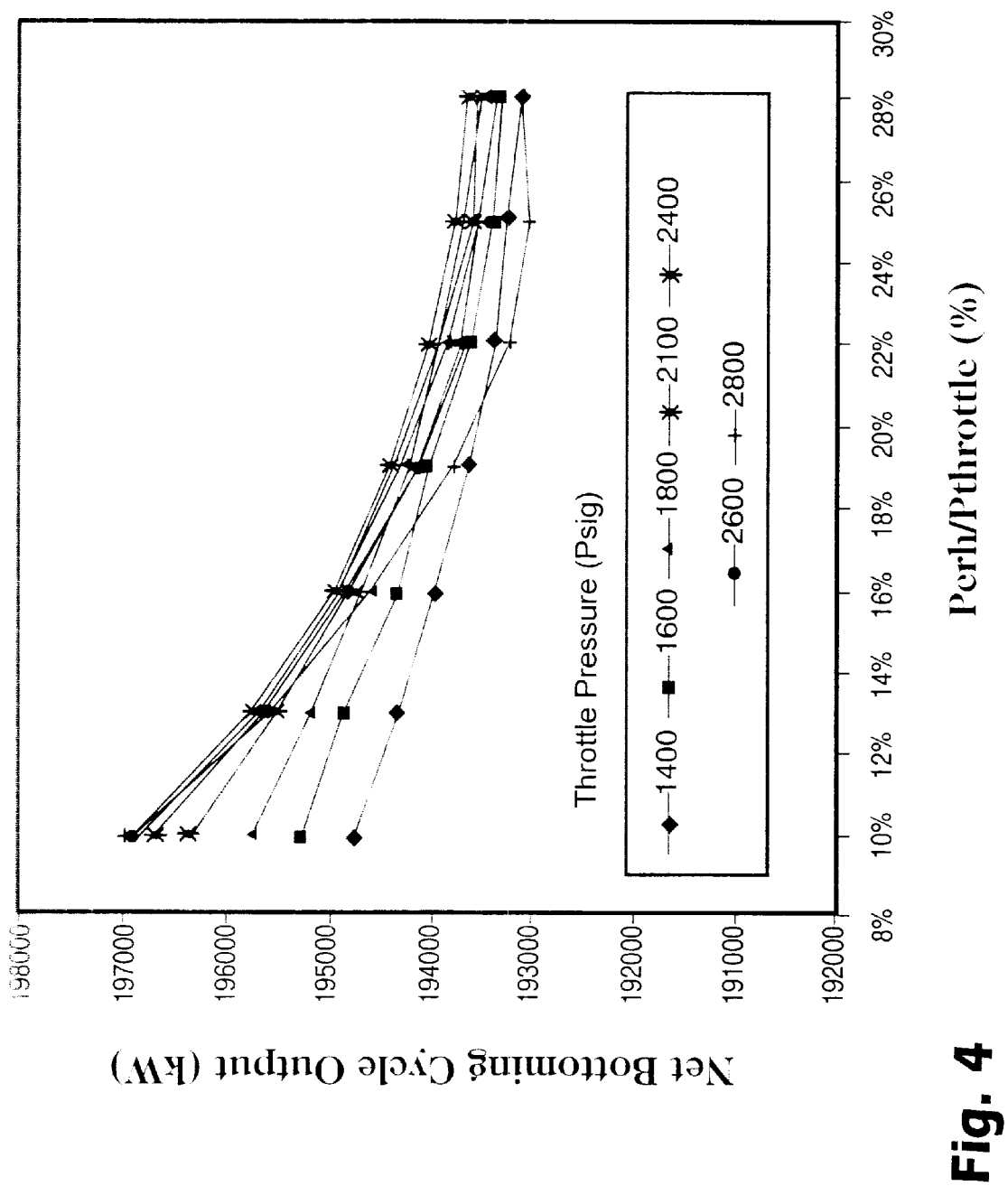
FIG. 4 is a graph of net bottoming cycle output versus cold reheat pressure for a range of throttle pressures.

FIG. 4 shows the results of the cycle study intended to identify optimum steam cycle conditions for a three pressure reheat steam cycle. In these figures, 10% and 13% $P_{CRH}/P_{THROTTLE}$ lines are with a cycle in accordance with the invention. As is particularly clear in FIG. 4, bottoming cycle performance improves with reduced reheat pressure ($P_{CRH}$) when the coldest reheater 184, 284 is allowed to be downstream of the HP evaporator 154, 254 in accordance with the invention.

As will be understood from the foregoing disclosure, this invention is applicable to all reheat combined cycles with sufficiently low hot reheat pressure constraints. Some systems may have constraints limiting the minimum practical reheat steam pressure (e.g. IGCC). These systems may also benefit from the proposed invention but will would generally favor high throttle pressures.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combined cycle system comprising:
    a gas turbine;
    a steam turbine; and
    a heat recovery steam generator for receiving exhaust gas from the gas turbine for heating steam from the steam turbine, said gas turbine exhaust gas flowing along an exhaust gas flow path from an entry end to an exit end of the heat recovery steam generator,
    wherein said heat recovery steam generator includes an evaporator arranged to supply steam to a superheater between the evaporator and the entry end of the heat recovery steam generator, a reheater disposed along said exhaust gas flow path, said reheater receiving cold reheat steam from the steam turbine and returning reheated steam to the steam turbine,
    wherein the reheater includes at least first and second sections, said first section being downstream of said second section along said exhaust gas flow path through said heat recovery steam generator,
    wherein said first section of said reheater is disposed downstream of said evaporator along said exhaust gas flow path and said second section of said reheater is disposed upstream of said evaporator along said exhaust gas flow path, and
    wherein said first and second sections of said reheater are disposed in series flow such that cool reheat steam from the steam turbine is received by said first section of said reheater and steam leaving the first section of the reheater is supplied to said second section of said reheater.

2. A combined cycle system as in claim 1, wherein said evaporator is a high pressure evaporator and further comprising an intermediate pressure evaporator downstream of said high pressure evaporator along said exhaust gas flow path.

3. A combined cycle system as in claim 2, wherein steam from said intermediate pressure evaporator flows through a conduit to be mixed with said cold reheat steam flow from the steam turbine to said first reheater section.

4. A combined cycle system as in claim 3, wherein said superheater is a high pressure superheater and further comprising an intermediate pressure superheater, said steam from said intermediate pressure evaporator flowing through said conduit to the intermediate pressure superheater before mixing with said cold reheat steam flow at an entrance of said first reheater section.

5. A combined cycle system as in claim 2, wherein said superheater is a high pressure superheater and further comprising an intermediate pressure superheater, and wherein steam from said intermediate pressure evaporator flows through a conduit to the intermediate pressure superheater.

6. A reheat steam cycle configuration as in claim 5, wherein steam from said intermediate pressure superheater is admitted to an intermediate pressure section of the steam turbine.

7. A combined cycle system as in claim 1, wherein said reheated steam from said reheater is returned to an intermediate pressure section of the steam turbine.

8. A reheat steam cycle configuration for a steam turbine and gas turbine combined cycle system, comprising:
- a steam turbine;
- a heat recovery steam generator operatively coupled to said steam generator for receiving exhaust fluid from said steam turbine and for converting said exhaust fluid into steam for return to said steam turbine return to said steam turbine;
- a gas turbine for supplying heat to said heat recovery steam generator in the form of exhaust gases;
- wherein said heat recovery steam generator includes a reheater for receiving cold reheat steam from the steam turbine and returning reheated steam to the steam turbine, and a superheater for receiving steam from an evaporator within said heat recovery steam generator, wherein steam in said reheater and steam in said superheater, flow in a direction generally opposite to a flow direction of said exhaust gases from said gas turbine,
- wherein the reheater includes at least first and second sections, said first section being downstream of said second section with respect to said flow direction of said exhaust gases,
- wherein said first section of said reheater is disposed downstream of said evaporator and said second section of said reheater is disposed upstream of said evaporator, with respect to said flow direction of said exhaust gases, and
- wherein said first and second sections of said reheater are disposed in series flow such that cool reheat steam from the steam turbine is received by said first section of said reheater and steam leaving the first section of the reheater is supplied to said second section of said reheater.

9. A reheat steam cycle configuration as in claim 8, further comprising a condenser for receiving exhaust steam from the steam turbine and for condensing said exhaust steam to water; and wherein said heat recovery steam generator receives water from said condenser and converts said water into said steam for return to said steam turbine.

10. A reheat steam cycle configuration as in claim 8, wherein said evaporator is a high pressure evaporator and further comprising an intermediate pressure evaporator downstream of said high pressure evaporator with respect to said flow direction of said exhaust gases.

11. A reheat steam cycle configuration as in claim 10, wherein said superheater is a high pressure superheater and further comprising an intermediate pressure superheater, and wherein steam from said intermediate pressure evaporator flows through a conduit to the intermediate pressure superheater.

12. A reheat steam cycle configuration as in claim 11, wherein steam from said intermediate pressure superheater is admitted to an intermediate pressure section of the steam turbine.

13. A reheat steam cycle configuration as in claim 10, wherein steam from said intermediate pressure evaporator flows through a conduit to be mixed with said cold reheat steam flow from the steam turbine to said reheater.

14. A reheat steam cycle configuration as in claim 13, wherein said superheater is a high pressure superheater and further comprising an intermediate pressure superheater, said steam from said intermediate pressure evaporator flows through a conduit to the intermediate pressure superheater before mixing with said cold reheat steam flow.

15. A reheat steam cycle configuration as in claim 8, wherein said reheated steam from said reheater is returned to an intermediate pressure section of the steam turbine.

16. A method of reheating cold steam in a combined cycle system including a gas turbine, a steam turbine, and a heat recovery steam generator for receiving exhaust gas from the gas turbine for heating steam from the steam turbine, said gas turbine exhaust gas flowing an entry end to an exit end of the heat recovery steam generator, said heat recovery steam generator including an evaporator arranged to supply steam to a superheater, said method comprising:
- flowing steam including a cold reheat steam flow from said steam turbine to a first section of said heat recovery steam generator disposed downstream of said evaporator with respect to said flow of said exhaust gases, thereafter flowing said steam to at least a second section of said heat recovery steam generator disposed upstream of said evaporator with respect to said flow of said exhaust gases, and thereafter flowing said steam to said steam turbine.

17. A method as in claim 16, wherein said evaporator is a high pressure evaporator and said heat recovery steam generator further includes an intermediate pressure evaporator downstream of said high pressure evaporator with respect to said flow of said exhaust gases, and wherein the method further comprises mixing steam from said intermediate pressure evaporator with said cold reheat steam flow from the steam turbine before flowing said steam to said first section.

18. A method as in claim 17, wherein said superheater is a high pressure superheater and said heat recovery steam generator further includes an intermediate pressure superheater, said steam from said intermediate pressure evaporator flowing through said intermediate pressure superheater before mixing with said cold reheat steam flow.

19. A method as in claim 16, wherein said evaporator is a high pressure evaporator and said superheater is a high pressure superheater and said heat recovery steam generator further includes an intermediate pressure evaporator and an intermediate pressure superheater downstream of said high pressure evaporator with respect to said flow of said exhaust gases, and wherein steam from said intermediate pressure evaporator flows through the intermediate pressure superheater and is admitted to an intermediate pressure section of the steam turbine.

* * * * *